UNITED STATES PATENT OFFICE.

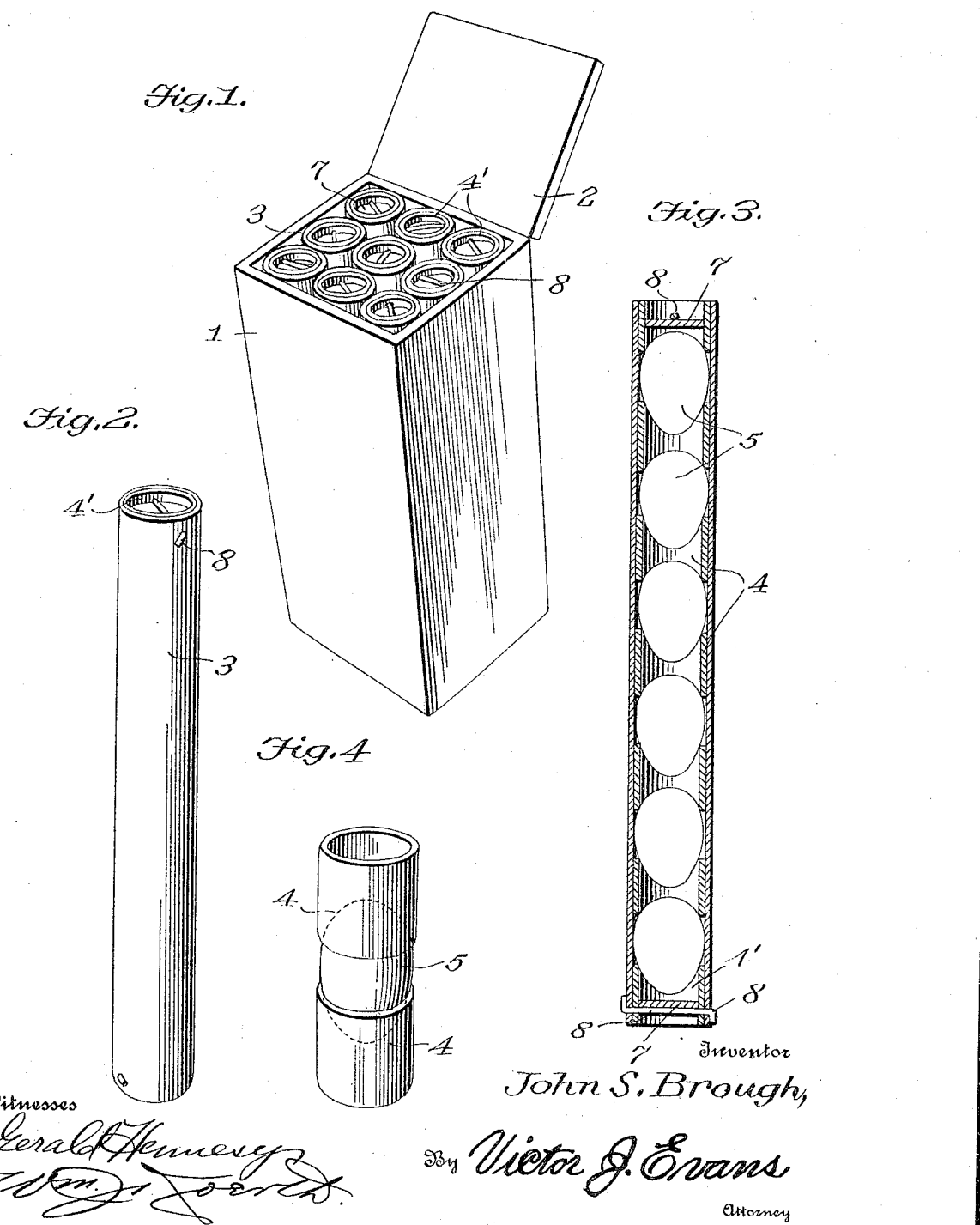

JOHN SANFORD BROUGH, OF REEDS, MISSOURI, ASSIGNOR TO FRANK MELUGIN, OF REEDS, MISSOURI.

EGG-CASE FILLER.

1,192,744.  Specification of Letters Patent.  Patented July 25, 1916.

Application filed February 10, 1915. Serial No. 7,376.

*To all whom it may concern:*

Be it known that I, JOHN S. BROUGH, a citizen of the United States, residing at Reeds, in the county of Jasper and State of Missouri, have invented new and useful Improvements in Egg-Case Fillers, of which the following is a specification.

The present invention relates to improvements in means for packing eggs, or the like for shipment, the primary object of the invention being to provide a container wherein a number of eggs may be deposited and sustained against contact either with each other or from outside contact, to permit the same being transported without danger of breakage or injury.

Other objects and advantages will be apparent as the nature of the invention is more fully understood, reference being had to the accompanying drawings in which:

Figure 1 is a perspective view of a shipping case having arranged therein a plurality of egg containing members, constructed in accordance with the present invention; Fig. 2 is a perspective view of one of the tubes containing eggs; Fig. 3 is a central vertical transverse sectional view of the device illustrated in Fig. 2; Fig. 4 is a detail perspective view illustrating the manner in which the short tubes or nests receive an egg and sustain the same against contact with another egg.

Referring now to the drawings in detail, the numeral 1 designates a shipping case, the same being provided with a closure 2 which is retained in locked position upon the case 1 in any desired or preferred manner. Arranged within the case 1 is a plurality of tubular members 3, the said members being of a length approximately corresponding with the length of the case 1. The tubes 3 are of a width to accommodate a plurality of eggs or similar fragile members, and in order to protect the eggs from contact with each other I provide a plurality of short tubular members or nests 4, the said nests fitting snugly within the tubular member 3 and being so disposed as to receive both the point and butt of the egg 5 so that both the point and butt of the said egg is retained a sufficient or suitable distance away from the opposite ends of the members 4 within which the said egg is received. Thus it will be noted that any number of nests may be employed to receive the desired number of eggs and that all of the eggs are sustained away from contact with each other. When the desired number of eggs are placed within the nests and the nests inserted within the tubular member 3 disks 7 are arranged at the opposite ends of the tubular member 3, the said disks being inserted within end nests 4' and being sustained in position through the medium of transverse securing members 8, the said members being preferably constructed of wire and being inserted transversely through both the tubular members 3 and the end nests 4' to sustain the said nests 4' within the tube and also to provide means whereby the end disks 7 may be removed from the tube 3 to permit of a plurality of nests being forced longitudinally through the tube and as a consequence allows all of the eggs and the nests being forced from the tube 3. It is, of course, to be understood that the case 1 contains a sufficient amount of tubes 3 to fully fill the same, and if desired, the said tubes may be arranged from contact with each other by some suitable short flexible material being inserted between the sides of the case and the opposite sides of the tubes.

I claim:—

An egg receptacle comprising a comparatively long tube, short tubes slidably arranged within the long tube and contacting therewith, said short tubes comprising nests spaced one away from the other to permit of the reception of the points of an egg in one of the ends of one of said short tubes and the reception of the butt of the egg in the adjacent short tube, the said short tubes being of a length sufficient to retain the point of the egg received in one end out of contact with the butt of the egg received in the other end of each of the tubes, disk members upon the end short tubes, and transverse members passing through the long tube and contacting with the disks for holding the disks of said short tubes and the short tube in the long tube.

In testimony whereof I affix my signature in presence of two witnesses.

JOHN SANFORD BROUGH.

Witnesses:
W. H. NEWELL,
J. T. PRIGMORE.

Copies of this patent may be obtained for five cents each, by addressing the "Commissioner of Patents, Washington, D. C."